Figures 1, 2, 3:
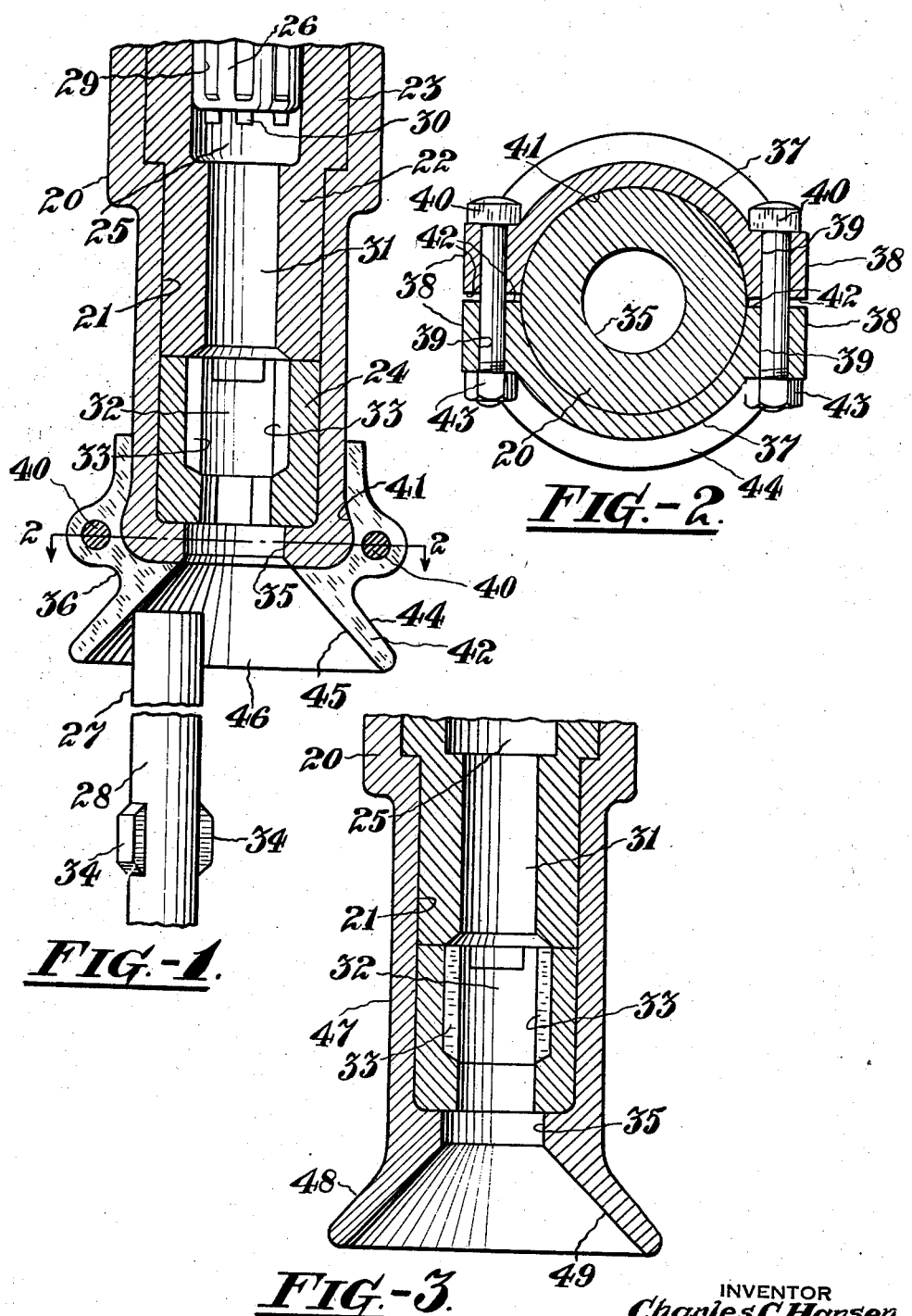

Sept. 21, 1937.  C. C. HANSEN  2,093,673
GUIDING DEVICE FOR WORKING IMPLEMENTS
Filed June 19, 1935

INVENTOR
Charles C. Hansen
BY
HIS ATTORNEY

Patented Sept. 21, 1937

2,093,673

UNITED STATES PATENT OFFICE 2,093,673

GUIDING DEVICE FOR WORKING IMPLEMENTS

Charles C. Hansen, Easton, Pa., assignor to Ingersoll-Rand Company, Jersey City, N. J., a corporation of New Jersey Application June 19, 1935, Serial No. 27,307

3 Claims. (Cl. 121—31)

This invention relates to rock drills, and more particularly to a guiding device for working implements actuated by rock drills of the hammer type and in which the working implement and the piston are capable of relative reciprocatory motion.

One object of the invention is to facilitate the insertion of the working implement into the rock drill.

Other objects will be in part obvious and in part pointed out hereinafter.

In the drawing accompanying this specification and in which similar reference characters refer to similar parts, Figure 1 is an elevation, in section, of the front end of a rock drill equipped with a guiding device constructed in accordance with the practice of the invention, Figure 2 is a transverse view taken through Figure 1 on the line 2—2, and Figure 3 is a view similar to Figure 1 showing a modified form of the invention.

Referring to the drawing and at first more particularly to Figures 1 and 2, 20 designates a rock drill front head of conventional type having a bore 21 to accommodate chuck mechanism 22 comprising a chuck 23 and a chuck jaw 24 which may be clutched to the front end of the chuck 23 in a well known manner.

In the rearward portion of the chuck 23 is a recess 25 to accommodate the front end of a hammer piston 26 which actuates the working implement 28. The piston 26 has the customary flutes 29 which slidably engage ribs 30 in the recess 25 for preventing relative rotary movement between the hammer piston and the chuck.

In the forward portion of the chuck 23 and extending from its front end to the recess 25 is a bore 31 to receive the shank 27 of the working implement, and a bore 32 extends through the chuck jaw 24 to permit the insertion of the working implement into the chuck. The chuck jaw 24 is of the well known "Leyner" type having introverted ribs 33 to engage lugs 34 on the working implement for transmitting the rotary movement of the chuck mechanism to the working implement.

The forward portion of the bore 32 in the chuck jaw is only of sufficiently larger diameter than the working implement to permit free slidable movement of the working implement in the chuck mechanism while at the same time maintaining the working implement substantially coaxial with the bore 31 and, therefore, with the hammer piston 26. In the front end of the front head is an aperture 35 of somewhat larger diameter than the bore 32 wherewith it coincides.

The guiding device, constructed in accordance with the practice of the invention and designated 36, is in the form of a casing consisting of two sections 37 which may be identical in all essential respects. On opposite sides of the casing sections 37 are lugs 38 having apertures 39 to accommodate bolts 40 whereby the casing sections may be clamped fixedly to the front head.

As a preferred mode of construction the rearward portions of the sections 37 are bored to define a recess 41 of substantially the same conformation as the front end of the front head 20 so that when the casing sections are disposed on the front head the surface of the recess will be in substantial body contact with the surface of the front head.

Preferably the casing sections are so constructed that when they are disposed on the front head the confronting surfaces 42 of the sections will be spaced a slight distance apart. In this way, when the nuts 43 on the bolts 40 are tightened, the casing sections will be clamped into close frictional contact with the front head. The guiding device 36 will, therefore, remain immovable on the front head and unaffected by the vibration incident to the operation of the rock drill.

On the front end of the guiding device 36 is a skirt 44, which flares outwardly to a larger diameter than the front head and the interior surface 45 of the guiding device inclines from the entrance 46 of the skirt to the aperture 35 to guide the shank 27 of the working implement into the chuck jaw.

In the modified form of the invention illustrated in Figure 3 the front head, designated 47, is provided with an integral portion or skirt 48. The skirt 48, as in the previously described modification, also flares outwardly from the front head and is, therefore, of funnel-shape. Its inner surface 49 is suitably inclined to provide a guiding surface along which the end of the shank of the working implement will slide into the front head.

In practice, the present invention has been found to be a highly efficient device for use in connection with a rock drill employed on submarine drilling apparatus, drill wagons and the like in which the rock drill is located a considerable distance from the rock face and in all forms of drilling necessitating the use of long working implements. In operations of this nature and, more particularly, when drilling submerged rock it is an extremely difficult matter to bring the shank end of a long working implement into coincidence with the bore in the chuck mechanism.

A great deal of time is usually consumed in effecting this connection for the reason that when a long drill steel is placed into the drill hole it is practically impossible to support it in a position in which its shank will be coaxial with the drill hole. Therefore, even though the drilling apparatus remains coaxial with the drill hole a great deal of maneuvering and shifting of the working implement is required in order to insert it into the chuck mechanism.

By providing the rock drill front head with a flared guiding portion, the rock drill may be lowered and during such movement the skirt of the guiding device will engage the working implement and guide it into the front end of the front head and in the correct operative position with respect to the chuck mechanism and the hammer piston. The entering of the working implement into the rock drill may, therefore, be effected quickly and easily.

I claim:

1. In a rock drill, the combination of a hollow front head and a working implement, and a skirt on the front head flaring outwardly beyond the periphery of the front head to guide the working implement into the front head.

2. In a rock drill, the combination of a hollow front head and a working implement, a guide member having a skirt flaring outwardly beyond the periphery of the front head to guide the working implement into the front head, and means for securing the guide member to the front head.

3. In a rock drill, the combination of a hollow front head and a working implement, a casing comprising a plurality of sections having skirt portions which in the assembled position of the sections on the front head flare outwardly beyond the outer surface of the front head to guide the working implement into the front head, and means for clamping the casing sections to the front head.

CHARLES C. HANSEN.